Patented Aug. 5, 1952

2,606,175

UNITED STATES PATENT OFFICE 2,606,175

POLYMERIZABLE COMPOSITIONS COMPRISING 2-VINYLBENZIMIDAZOLE AND POLYMERIZATION PRODUCTS THEREOF

John A. Price, Stamford, Conn., assignor to American Cyanamid Company, New York, N. Y., a corporation of Maine No Drawing. Application April 12, 1951, Serial No. 220,730

12 Claims. (Cl. 260—85.5)

1

This invention relates to the production of new materials having valuable and characteristic properties that make them especially suitable for use in industry, for example in molding, casting, coating, electrically insulating and adhesive applications, and for other purposes. More particularly the invention is concerned with polymerizable compositions comprising, by weight, (1) from 1% to 75% (about 1% to about 75%) of 2-vinylbenzimidazole and (2) from 25% to 99% (about 25% to about 99%) of a compound which is different from the compound of (1), is copolymerizable therewith and which contains a $CH_2=C<$ grouping or a plurality of $CH_2=C<$ groupings, e. g., styrene, acrylonitrile, ethyl acrylate, glycidyl methacrylate, vinyl acetate, diallyl phthalate, divinyl benzene, etc., or a plurality of such compounds. The scope of the invention also includes products comprising the polymerized composition obtained by polymerization of the aforementioned polymerizable composition, as well as method features whereby new and useful synthetic compositions are produced.

To the best of my knowledge and belief, 2-vinylbenzimidazole is a chemical compound that has not been described in the published literature; that is to say, the published literature to date contains no description of a method of preparing and isolating this monomer as such. In the absence of such a description in the published literature, there is given below one suitable method of preparing and isolating the compound:

Preparation of 2-vinylbenzimidazole

Twenty-one (21) parts of purified 2-($\beta$-chloroethyl)benzimidazole is allowed to stand for several days at room temperature in a slightly moist atmosphere, e. g., in a vacuum desiccator over solid sodium hydroxide with the stopcock open, or in a loosely capped bottle. The reaction is complete when the product has become water-soluble. The amount of moisture that is present should not be sufficient to cause a visible change in the solid, such as gumming. After the 2-($\beta$-chloroethyl)benzimidazole has become completely converted to 2-vinylbenzimidazole hydrochloride, it is dissolved in 200 parts of cold water, and the solution is decolorized with activated carbon and filtered. The filtrate is chilled well, and made slightly basic by the addition of ammonium hydroxide. The precipitate is filtered, washed and dried under vacuum. It is extracted with cold ethylene chloride, and the residue comprising 2-vinylbenzimidazole is recrystallized from hot ethylene chloride, with activated carbon treatment. (Heat causes slow polymerization of the compound and, so far as is possible, should

2 be avoided in the preparation.) The yield amounts to about 6.2 parts; M. P. 169°–170° C. (corrected), with fairly rapid heating in determining the melting point. It may here be noted that the results of melting-point determinations are quite variable, and may be as high as 184°–187° C. (corrected).

It is one of the primary objects of the present invention to prepare a new class of copolymers or interpolymers for use in industry.

Another object of the invention is to improve the usefulness of 2-vinylbenzimidazole whereby its field of utility is enhanced.

Still another and important object of the invention is the production of copolymers or interpolymers of a basic monomer, specifically 2-vinylbenzimidazole, and one or more non-basic monomers, e. g., acrylonitrile, which polymerization products are more readily dyed, especially with acid dyes, than polymers of acrylonitrile or other non-basic monomer alone, or than many of the previously known or suggested copolymers of (1) acrylonitrile (or other non-basic monomer) and (2) another different monomer or monomers.

Another object of the invention is to prepare copolymers which can be spun or otherwise shaped to form filaments, tapes, ribbons, tubes, rods, sheets, etc., and the shaped articles then dyed either before or after having been oriented or treated to improve their useful properties.

Other objects of the invention will be apparent to those skilled in the art from the description and examples which follow.

The foregoing objects are attained by copolymerization of 2-vinylbenzimidazole with one or more other comonomers which are copolymerizable therewith, more particularly such comonomers which contain either a single or a plurality of $CH_2=C<$ groupings, using, by weight, from about 1% to about 75%, preferably (for the usual applications) from about 1 or 2% to about 15 or 20%, of 2-vinylbenzimidazole and from about 25% to about 99%, preferably (for the usual applications) from about 98 or 99% to about 80 or 85% of a comonomer (or comonomers) containing one or more $CH_2=C<$ groupings. Heat, light or heat and light can be used to effect or to accelerate polymerization of the mixture of comonomers, although under such conditions the rate of polymerization in some cases may be relatively slow, as for instance when the 2-vinylbenzimidazole constitutes only a small amount (e. g., 1 to 5%) of the mixture of comonomers and the other comonomer normally has a slow polymerization rate. Hence, it is usually preferred to accelerate the polymerization by employing a polymerization catalyst accompanied by heat, light or heat and light. Further details of polymerization conditions are given hereinafter.

Examples of monomers (comonomers) containing a $CH_2=C<$ grouping that can be copolymerized with 2-vinylbenzimidazole in the weight proportions hereinbefore mentioned, singly or a plurality (two, three, four or any desired number) thereof, the latter often being desirable in order to improve the compatibility and copolymerization characteristics of the mixture of monomers and to obtain new and valuable copolymers having the particular properties desired for a particular service application, are such monomers as the unsaturated alcohol esters, more particularly the allyl, methallyl, crotyl, 1-chloroallyl, 2-chloroallyl, cinnamyl, vinyl, methvinyl, 1-phenylallyl, butenyl, etc., esters of saturated and unsaturated, aliphatic and aromatic, monobasic and polybasic acids such, for instance, as acetic, propionic, butyric, valeric, caproic, acrylic and alpha-substituted acrylic (including alkacrylic, e. g., methacrylic, ethacrylic, propacrylic, etc., and arylacrylic, e. g., phenylacrylic, etc.), crotonic, oxalic, malonic, succinic, glutaric, adipic, pimelic, suberic, azelaic, sebacic, fumaric, citraconic, mesaconic, itaconic, acetylene dicarboxylic, aconitic, benzoic, phenylacetic, phthalic, terephthalic, benzoylphthalic, etc., acids; the saturated monohydric alcohol esters, e. g., the methyl, ethyl, propyl, isopropyl, butyl, sec.-butyl, amyl, etc., esters of unsaturated aliphatic monobasic and polybasic acids, illustrative examples of which appear above; vinyl cyclic compounds (including monovinyl aromatic hydrocarbons), e. g., styrene, o-, m- and p-chlorostyrenes, -bromostyrenes, -fluorostyrenes, -methylstyrenes, -ethylstyrenes, -cyanostyrenes, the various polysubstituted styrenes such, for example, as the various di-, tri- and tetra-chlorostyrenes, -bromostyrenes, -fluorostyrenes, -methylstyrenes, -ethylstyrenes, -cyanostyrenes, etc., vinyl naphthalene, vinylcyclohexane, vinyl furane, vinyl pyridine, vinyldibenzofuran, divenyl benzene, trivinyl benzene, allyl benzene, diallyl benzene, N-vinyl carbazole, the various allyl cyanostyrenes, the various alpha-substituted styrenes and alpha-substituted ring-substituted styrenes, e. g., alpha-methyl styrene, alpha-methyl-para-methyl styrene, etc.; unsaturated ethers, e. g., ethyl vinyl ether, diallyl ether, ethyl methallyl ether, etc.; unsaturated amides, for instance N-allyl caprolactam, acrylamide, and N-substituted acrylamides, e. g., N-methylol acrylamide, N-allyl acrylamide, N-methyl acrylamide, N-phenyl acrylamide, etc.; unsaturated ketones, e. g., methyl vinyl ketone, methyl allyl ketone, etc.; methylene malonic esters, e. g., methylene methyl malonate, etc.; butadienes, e. g., 1,3-butadiene, 2-chlorobutadiene, etc.; unsaturated polyhydric alcohol (e. g., butenediol, etc.) esters of saturated and unsaturated, aliphatic and aromatic, monobasic and polybasic acids, illustrative examples of which appear above; unsaturated glycidyl esters such as glycidyl acrylate, glycidyl methacrylate, glycidyl itaconate, glycidyl allyl phthalate, etc.

Other examples of monomers that can be copolymerized with 2-vinylbenzimidazole to produce my new copolymer compositions are the vinyl halides, more particularly vinyl fluoride, vinyl chloride, vinyl bromide and vinyl iodide, and the various vinylidene compounds, including the vinylidene halides, e. g., vinylidene chloride, vinylidene bromide, vinylidene fluoride and vinylidene iodide, other comonomers being added if needed in order to improve the compatability and copolymerization characteristics of the mixed monomers.

Other and more specific examples of monomeric materials which can be mixed or blended with 2-vinylbenzimidazole in the aforementioned proportions, and the resulting homogeneous or substantially homogeneous, polymerizable composition then polymerized, as hereinafter more fully described, to yield new and valuable copolymer compositions are the allyl compounds which are different from 2-vinylbenzimidazole and especially those which have a boiling point of at least about 60° C. Of the monomeric materials which can be used the allyl esters form a large class. The reactive allyl compounds employed are preferably those which have a high boiling point such, for example, as diallyl maleate, diallyl fumarate, diallyl phthalate, diallyl succinate, etc. Other allyl compounds which are not necessarily high boiling also may be used.

Additional examples of allyl compounds, and of other compounds containing one or more $CH_2=C<$ groupings that can be used in producing the new and useful copolymers or interpolymers of the present invention, are given in, for example, the copending application of Erhart K. Drechsel and John J. Padbury, Serial No. 121,066, filed October 12, 1949, now Patent No. 2,550,652, dated April 24, 1951, with particular reference to monomers used in forming copolymers with diallyl cyanamide.

Among the comonomers which are preferred for use in carrying my invention into effect are the vinyl compounds, including the vinyl aromatic compounds, more particularly the vinyl aromatic hydrocarbons (e. g., styrene, isopropenyl toluene, the various dialkyl styrenes, etc.), and the vinyl aliphatic compounds, e. g., acrylonitrile, acrylamide, etc., and other compounds containing a $CH_2=C<$ grouping, e. g., the various substituted acrylonitriles (e. g., methacrylonitrile, ethacrylonitrile, phenylacrylonitrile, etc.), the various substituted acrylamides (e. g., methacrylamide, ethacrylamide, the various N-substituted acrylamides and alkacrylamides, for instance N-methylol acrylamide, N-monoalkyl and -dialkyl acrylamides and methacrylamides, e. g., N-monomethyl, -ethyl, -propyl, -butyl, etc., and N-dimethyl, -ethyl, -propyl, -butyl, etc., acrylamides and methacrylamides, N-monoaryl and -diaryl acrylamides and alkacrylamides, e. g., N-monophenyl and -diphenyl acrylamides and methacrylamides, etc.), vinyl esters, e. g., vinyl acetate, vinyl propionate, vinyl butyrate, vinyl isobutyrate, vinyl valerate, vinyl acrylate, vinyl methacrylate, etc., esters of an acrylic acid (including acrylic acid itself and the various alpha-substituted acrylic acids, e. g., methacrylic acid, ethacrylic acid, phenylacrylic acid, etc.), more particularly the alkyl esters of an acrylic acid, e. g., the methyl, ethyl, propyl, isopropyl, n-butyl, isobutyl, sec.-butyl, tert.-butyl, amyl, hexyl, heptyl, octyl, decyl, dodecyl, etc., esters of acrylic, methacrylic, ethacrylic, phenylacrylic, etc., acids, including the alkyl acrylates containing not more than four carbon atoms in the alkyl grouping, examples of which are given above, as well as other vinyl aromatic and vinyl aliphatic compounds, and other compounds containing a $CH_2=C<$ grouping.

Any suitable means may be used in effecting polymerization of the admixture of 2-vinylbenzimidazole and one or more other monomers which are copolymerizable therewith. As has been mentioned hereinbefore heat or light or both, with or without a polymerization catalyst, can be used. Ultraviolet light is more effective than ordinary light. Preferably a polymerization catalyst is employed. Any of the polymerization catalysts which are suitable for use in polymerizing compounds containing an ethylenically unsaturated grouping, specifically a vinyl grouping, can be employed. Among such catalysts are the inorganic peroxides, e. g., hydrogen peroxide, barium peroxide, magnesium peroxide, etc., and the various organic peroxy catalysts, illustrative examples of which latter are: the dialkyl peroxides, e. g., diethyl peroxide, dipropyl peroxide, dilauryl peroxide, dioleyl peroxide, distearyl peroxide, di-(tert.-butyl) peroxide and di-(tert.-amyl) peroxide, such peroxides often being designated as ethyl, propyl, lauryl, oleyl, stearyl, tert.-butyl and tert.-amyl peroxides; the alkyl hydrogen peroxides, e. g., tert.-butyl hydrogen peroxide (tert.-butyl hydroperoxide), tert.-amyl hydrogen peroxide (tert.-amyl hydroperoxide), etc.; symmetrical diacyl peroxides, for instance peroxides which commonly are known under such names as acetyl peroxide, propionyl peroxide, lauroyl peroxide, stearoyl peroxide, malonyl peroxide, succinyl peroxide, phthaloyl peroxide, benzoyl peroxide, etc.; fatty oil acid peroxides, e. g., coconut oil acid peroxides, etc.; unsymmetrical or mixed diacyl peroxides, e. g., acetyl benzoyl peroxide, propionyl benzoyl peroxide, etc.; terpene oxides, e. g., ascaridole, etc.; and salts of inorganic per-acids, e. g., ammonium persulfate, sodium persulfate, potassium persulfate, sodium percarbonate, potassium percarbonate, sodium perborate, potassium perborate, sodium perphosphate, potassium perphosphate, etc. Other examples of organic peroxide and of other catalysts that can be employed are given in the aforementioned Drechsel and Padbury copending application Serial No. 121,066.

The concentration of the catalyst employed is usually small, that is, for the preferred catalysts from, by weight, about 0.5 or 1 part of catalyst per thousand parts of the polymerizable composition to be polymerized to about 3 or 4 or more parts of catalyst per 100 parts of the monomer or mixture of comonomers. If an inhibitor of the kind hereinafter mentioned be present, larger amounts of catalyst may be necessary according to the concentration of the inhibitor.

If desired, the mixed monomers can be polymerized in emulsion or in solution state to yield a copolymer. In the latter case, various inert organic solvents may be employed, depending upon the particular comonomer used, e. g., toluene, xylene, dioxane, ethers (e. g., dibutyl ether), esters (e. g., butyl acetate), chlorobenzene, ethylene dichloride, ketones (e. g., methyl ethyl ketone), tertiary alcohols, for instance tertiary-butyl alcohol, tertiary-amyl alcohol, tertiary-hexyl alcohol, etc., as well as others. When the reaction is effected in solution state, then a temperature at or approaching the boiling temperature of the solution generally is used.

The polymerization also can be effected by conventional bulk polymerization technique, in the presence or absence of a solvent capable of dissolving the monomeric mixture and in which the latter preferably is inert; or in solution in a solvent in which the monomeric mixture is soluble but the copolymer is insoluble; or by conventional bead polymerization methods. The polymerization of the mixture of monomers can be effected by a continuous process as well as by a batch operation.

The temperature of polymerization of the polymerizable composition, at atmospheric or slightly above atmospheric pressure and in the presence or absence of a polymerization catalyst, can be varied over a wide range, up to and including or slightly above the boiling point (at atmospheric pressure) of the monomeric mixture (or of the lowest boiling component thereof), but in all cases is below the decomposition temperature of the monomeric materials. In most cases the polymerization temperature will be within the range of 15° C. to 150° C., more particularly within the range of 20° C. or 30° C. (ordinary room temperature) to 130° C., depending upon the particular mixture of monomers employed, the particular catalyst, if any, used, the rapidity of polymerization wanted, and other influencing factors. With certain catalysts, more particularly strong acidic polymerization catalysts such, for instance, as gaseous boron trifluoride-ethyl ether complex, concentrated sulfuric acid, anhydrous aluminum chloride, etc., a substantially lower polymerization temperature often advantageously may be used, e. g., temperatures ranging between −80° C. and 0° C. or 10° C. At the lower temperatures below the solidification point of the monomeric mixture (or components thereof), polymerization is effected while the mixture of monomers is dissolved or dispersed in a solvent or dispersion medium which is liquid at the temperature of polymerization. Or, if desired, the monomeric mixture, that is, the polymerizable composition, can be polymerized in dissolved or dispersed state at temperatures above its solidification point or above the solidification point of the polymerizable components thereof. The copolymer can be separated from the liquid medium in which copolymerization was effected by any suitable means, e. g., by filtration, centrifuging, solvent extraction, etc.

In some cases it may be desirable to incorporate into the polymerizable composition an inhibitor which is adapted to inhibit copolymerization of the individual monomers present in the composition. When it is desired to use the inhibitor-modified composition, a catalyst is added in an amount sufficient to promote the polymerization reaction and to yield a copolymer. Any suitable inhibitor can be used, e. g., tannin, phenol, resoncinol, hydroquinone, ascorbic acid, iso-ascorbic acid, phenyl-α-naphthylamine, N,N'-di-2-naphthyl-p-phenylenediamine, certain cupric salts, e. g., cupric acetate, etc. The amount of the polymerization inhibitor may be considerably varied, but ordinarily it is employed in an amount not exceeding 3%, generally less than 1%, by weight of the monomer or mixture of comonomers, e. g., from 0.01% to 0.5% or 0.6% by weight thereof.

In order that those skilled in the art may better understand how the present invention can be carried into effect, the following examples are given by way of illustration and not by way of limitation. All parts and percentages are by weight.

*Example 1*

This example illustrates the preparation of homopolymeric acrylonitrile, which was subsequently employed in comparative tests with certain of the copolymers of the present invention.

A reaction vessel, equipped with a stirrer, reflux condenser, thermometer and gas-inlet tube, was placed in a constant-temperature bath which was maintained at 35° C. To the vessel was added a solution of 53.0 parts of acrylonitrile, 900 parts of distilled water and 0.29 part of sulfuric acid. A rapid stream of pre-purified nitrogen was passed over the surface of the solution for 30 minutes. The nitrogen flow was then reduced to about one bubble per second. A reduction-oxidation catalyst system ("redox" system) consisting of 1.71 parts of ammonium persulfate and 0.71 part of sodium meta-bisulfite, each dissolved in 50 parts of water, was then added. The solution first became cloudy at the end of 3 minutes, and the polymerization was fairly exothermic for the first half hour. The polymerization was continued for a total of 4 hours at 35° C. The pH of the reaction product was 3.1. The polymer was collected on a Büchner funnel, washed with 1000 parts of distilled water followed by about 160 parts of methanol. The polymer was dried in an oven at 70° C. for about 16 hours. The yield of dry polyacrylonitrile, which was white, amounted to 48 parts.

Example 2

A reaction vessel, equipped with a stirrer, reflux condenser, thermometer and gas-inlet tube was placed in a constant-temperature bath which was maintained at 35° C. To the vessel was added a solution of 50.35 parts of acrylonitrile, 2.65 parts of 2-vinylbenzimidazole, 900 parts of distilled water, and 0.91 part of sulfuric acid. The pH of this solution was 3.2. A rapid stream of pre-purified nitrogen was passed over the surface of the solution for 30 minutes. The nitrogen flow was then decreased to one bubble per second. To the vessel was then added 1.71 parts of ammonium persulfate and 0.36 part of sodium bisulfite (meta), each dissolved in 50 parts of water. The polymerization was carried out for 6 hours at 35° C. The copolymer was collected on a Büchner funnel, washed with 2,000 parts of deionized water and was dried in an oven at 70° C. for about 16 hours. The yield of dry, white copolymer of acrylonitrile and 2-vinylbenzimidazole amounted to 49 parts.

Example 3

To a reaction vessel, equipped as in Example 2, was added a solution of 8.5 parts of acrylonitrile, 1.5 parts of 2-vinylbenzimidazole, 150 parts of distilled water and 0.52 part of sulfuric acid. The pH of this solution was 3.2. A rapid stream of pre-purified nitrogen was passed over the surface of the solution for 30 minutes. The nitrogen flow was then decreased to one bubble per second. To the vessel was then added 0.34 part of ammonium persulfate and 0.14 part of sodium bisulfite (meta), each dissolved in 25 parts of water. The polymerization was carried out for 4 hours at 35° C. The copolymer was collected on a Büchner funnel, washed with 500 parts of deionized water and dried in an oven at 70° C. The yield of dry, white copolymer of acrylonitrile and 2-vinylbenzimidazole amounted to 6.0 parts.

Example 4

To a reaction vessel, equipped as in Example 2, was added a solution of 9.8 parts of acrylonitrile, 0.2 part of 2-vinylbenzimidazole, 150 parts of distilled water and 0.073 part of sulfuric acid. The pH of this solution was 3.2. A rapid stream of pre-purified nitrogen was passed over the surface of the solution for 30 minutes. The nitrogen flow was then decreased to one bubble per second. To the vessel was then added 0.34 part of ammonium persulfate and 0.07 part of sodium bisulfite (meta), each dissolved in 25 parts of water. The polymerization was carried out for 4 hours at 35° C. The copolymer was collected on a Büchner funnel, washed with 500 parts of deionized water and dried in an oven at 70° C. The yield of dry, white copolymer of acrylonitrile and 2-vinylbenzimidazole amounted to 8.0 parts.

Example 5

Samples of the homopolymeric acrylonitrile of Example 1 and of the copolymers of Examples 2, 3 and 4 were subjected to the following dye test:

A sample (5 parts) of the dry polymer or copolymer was added to a dye bath consisting of 500 parts of an aqueous solution containing 0.2 part of concentrated sulfuric acid, 1 part of sodium sulfate and 0.2 part of Calcocid Alizarine Blue SAPG (Color Index No. 1054). The dye bath was boiled for 30 minutes, after which the polymerization product was filtered off and washed with hot water until the water was free of dye. The copolymer of Examples 2, 3 and 4 were dyed blue, the intensity being directly proportional to the percentage of 2-vinylbenzimidazole used in forming the copolymer; that is, copolymers containing the higher content of 2-vinylbenzimidazole yielded the deeper dyeings. In marked contrast, the homopolymeric acrylonitrile of Example 1 failed to absorb any dye. The advantage of modifying an acrylonitrile polymerization product by replacing a part (e. g., from about 1.0% to about 15% or more, still more particularly from 2% to 5 or 10%) of the initial acrylonitrile with 2-vinylbenzimidazole thereby to obtain a copolymeric acrylonitrile substance of improved dyeability is therefore quite apparent.

Example 6

| | Parts |
|---|---|
| 2-vinylbenzimidazole | 5.0 |
| Ethyl acrylate | 45.0 |
| Methyl ethyl ketone | 50.0 |
| Benzoyl peroxide | 0.25 |

The ethyl acrylate, benzoyl peroxide and a solution of the 2-vinylbenzimidazole dissolved in the methyl ethyl ketone were charged to a glass reaction vessel which was then flushed with nitrogen, and placed in a water bath maintained at 65°–70° C. for 4 hours. At the end of this polymerization period the contents of the vessel was diluted with water. The precipitated copolymer was collected by filtration through a Büchner funnel. The dry copolymer was a light-cream in color.

Example 7

| | Parts |
|---|---|
| 2-vinylbenzimidazole | 5.0 |
| Styrene | 45.0 |
| Methyl ethyl ketone | 50.0 |
| Benzoyl peroxide | 0.5 |

The same procedure was followed as described under Example 6 with the exception that the water bath was maintained at 85°–95° C. and the polymerization period was 6 hours. Thereafter the methyl ethyl ketone was removed from the reaction vessel by distillation, leaving a tough, amber-colored, solid copolymer of 2-vinylbenzimidazole and styrene.

Example 8

| | Parts |
|---|---|
| 2-vinylbenzimidazole | 1.0 |
| Vinyl acetate | 19.0 |
| Methyl ethyl ketone | 20.0 |
| Benzoyl peroxide | 0.2 |

The same procedure was followed as described under Example 6 with the exception that the period of polymerization in the 65°–70° C. water bath was only 2 hours. Upon dilution of the reaction mass with water, a copolymer of vinyl acetate and 2-vinylbenzimidazole separated as a white solid.

Example 9

| | Parts |
|---|---|
| 2-vinylbenzimidazole | 1.0 |
| Ethyl acrylate | 1.0 |
| Methyl ethyl ketone | 20.0 |
| Benzoyl peroxide | 0.2 |

The same procedure was followed as described under Example 6 with the exception that the water bath was maintained at 75°–85° C. and the polymerization period was only 1 hour. Upon dilution of the reaction mass with water, a copolymer of 2-vinylbenzimidazole and ethyl acrylate separated as a light cream-colored solid.

Example 10

| | Parts |
|---|---|
| 2-vinylbenzimidazole | 1.5 |
| Styrene | 0.5 |
| Methyl ethyl ketone | 30.0 |
| Benzoyl peroxide | 0.2 |

The same procedure was followed as described under Example 6 with the exception that the water bath was maintained at 65°–75° C. and the polymerization period was only 1 hour. Upon dilution of the reaction mass with water, a copolymer of 2-vinylbenzimidazole and styrene separated as a light cream-colored solid.

Example 11

| | Parts |
|---|---|
| 2-vinylbenzimidazole | 5.0 |
| Ethyl acrylate | 22.5 |
| Styrene | 22.5 |
| Methyl ethyl ketone | 50.0 |
| Benzoyl peroxide | 0.38 |

The same procedure was followed as described under Example 6 with the exception that the water bath was maintained at 80°–90° C. and the polymerization period was 6 hours. A solid interpolymer of 2-vinylbenzimidazole, ethyl acrylate and styrene precipitated upon diluting the reaction mass with water.

Example 12

A tripolymer of acrylonitrile, methyl acrylate and 2-vinylbenzimidazole is produced by following exactly the same procedure given under Example 1 with the exception that 1.325 parts of methyl acrylate and 1.325 parts of 2-vinylbenzimidazole are used in place of 2.65 parts of 2-vinylbenzimidazole. Similar results are obtained, although the subsequent dyeing with an acid dye as in Example 5 yields a dyed article having a depth of color closer to that of the copolymer of Example 4 when similarly dyed.

Although the new copolymers of this invention are particularly useful in the formation of fibers or filaments which are more amenable to dyeing than homopolymeric acrylonitrile, they also have numerous other applications in the plastics and coating arts. For instance, with or without a filler or other additive, they may be used as molding composition (or as components of molding compositions) from which molded articles are produced by molding the compositions under heat and pressure, e. g., temperatures of the order of 130° C. or 140° C. to 200° C. and under pressures up to 10,000 pounds or more per square inch. Among the fillers that can be employed in the production of molded compositions are alpha-cellulose pulp, asbestos fibers, cotton flock, chopped cloth cuttings, glass fibers, wood flour, antimony oxide, titanium dioxide, sand, clay, mica dust, diatomaceous earth, etc.

The polymerizable compositions of my invention can be used in the production of castings of any desired shape or size; as adhesives; in the treatment of paper or paper stock; in coating compositions; and for various other purposes. The copolymer can be formed in situ after application of the monomeric mixture to the base material to be coated, impregnated or otherwise treated.

Fibers can be produced from the copolymers of the present invention in the manner described in, for example, the copending application of Arthur Cresswell, Serial No. 76,668, filed February 15, 1949, with particular reference to the production of a molecularly oriented fiber from a copolymer of acrylonitrile and allyl alcohol. The unoriented and oriented fibers produced from my new copolymers are readily dyed, especially with an acid dye, while the fiber is in either a gel (e. g., aquagel) or a dry state.

The new materials (polymerizable compositions and polymerization products) of this invention have numerous other uses, for example, uses such as are given in the aforementioned Drechsel and Padbury copending application Serial No. 121,066 with particular reference to polymerizable and polymerized compositions produced from diallyl cyanamide.

In a manner similar to that herein described with reference to polymerizable and polymerized compositions produced from 2-vinylbenzimidazole, other vinylbenzimidazoles, e. g., 1-vinylbenzimidazole, 1-substituted (e. g., 1-alkyl, 1-aryl, etc.)-2-vinylbenzimidazole, 4-vinylbenzimidazole, 5-vinylbenzimidazole, 6-vinylbenzimidazole, 7-vinylbenzimidazole, 1,2-divinylbenzimidazole, 5,7-divinylbenzimidazole, 2,5-divinylbenzimidazole, etc., as and when they are available, could be copolymerized with comonomers to yield copolymer compositions of improved dyeability and other valuable properties. Likewise, copolymers similarly could be made from 2-vinylimidazoline, which has the formula

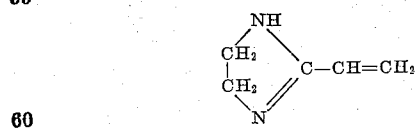

as well as from 1-vinylimidazoline (N-vinylimidazoline) and the other vinylimidazolines, including the 1-substituted-2-vinylimidazolines.

I claim:

1. A polymerizable composition comprising, by weight, (1) from 1% to 75% of 2-vinylbenzimidazole and (2) from 25% to 99% of a compound which is different from the compound of (1), is copolymerizable therewith and which contains a $CH_2=C<$ grouping.

2. A product comprising the polymerized composition of claim 1.

3. A composition comprising a copolymer of copolymerizable ingredients including, by weight, (1) from 1% to 20% of 2-vinylbenzimidazole and (2) from 80% to 99% of a vinyl compound.

4. A composition as in claim 3 wherein the vinyl compound of (2) is a vinyl aromatic compound.

5. A composition as in claim 4 wherein the vinyl aromatic compound is a vinyl aromatic hydrocarbon.

6. A composition as in claim 5 wherein the vinyl aromatic hydrocarbon is styrene.

7. A composition as in claim 3 wherein the vinyl compound is a vinyl aliphatic compound.

8. A composition as in claim 7 wherein the vinyl aliphatic compound is acrylonitrile.

9. A composition as in claim 7 wherein the vinyl aliphatic compound is an alkyl ester of an acrylic acid.

10. A composition as in claim 9 wherein the alkyl ester is an alkyl acrylate containing not more than 4 carbon atoms in the alkyl grouping.

11. A copolymer of mixed monomers consisting of from about 2% to about 15% by weight of 2-vinylbenzimidazole and the remainder acrylonitrile.

12. The method of preparing a new synthetic composition which comprises polymerizing a polymerizable mixture containing, by weight, (1) from 1% to 75% of 2-vinylbenzimidazole and (2) from 25% to 99% of a compound which is different from the compound of (1), is copolymerizable therewith and which contains a $CH_2=C<$ grouping.

JOHN A. PRICE.

REFERENCES CITED

The following references are of record in the file of this patent:

Journal of The American Chemical Society, vol. 71, June 1949, pp. 1985–1988 (article by Bachman et al.).